(12) United States Patent
Duquesne et al.

(10) Patent No.: US 12,102,038 B2
(45) Date of Patent: Oct. 1, 2024

(54) APPARATUS AND METHOD FOR ADJUSTING FACEPLATE OF FEEDER FOR AGRICULTURAL VEHICLE

(71) Applicant: CNH Industrial America LLC, New Holland, PA (US)

(72) Inventors: Frank R. G. Duquesne, Zwevegem (BE); Lyle Beidler, Akron, PA (US); Nathan E. Isaac, Lancaster, PA (US); Cale Boriack, Lititz, PA (US); Scott Wilson, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 632 days.

(21) Appl. No.: 17/406,514

(22) Filed: Aug. 19, 2021

(65) Prior Publication Data
US 2023/0058333 A1     Feb. 23, 2023

(51) Int. Cl.
*A01D 41/16* (2006.01)
*A01D 41/06* (2006.01)

(52) U.S. Cl.
CPC ............ *A01D 41/16* (2013.01); *A01D 41/06* (2013.01)

(58) Field of Classification Search
CPC ...... A01D 41/16; A01D 41/06; A01D 41/144; A01D 41/148; A01D 47/00
See application file for complete search history.

(56) References Cited

U.S. PATENT DOCUMENTS

| 5,460,460 A * | 10/1995 | Alexander ............... B66F 7/08 14/71.3 |
| 5,918,448 A | 7/1999 | Wheeler |
| 6,116,008 A | 9/2000 | Digman et al. |
| 6,318,058 B1 | 11/2001 | Emmert |
| 6,330,782 B1 | 12/2001 | Digman et al. |
| 8,010,262 B2 | 8/2011 | Schroeder et al. |
| 9,844,184 B2 * | 12/2017 | Johnson ............... A01D 75/287 |
| 9,867,324 B2 * | 1/2018 | De Coninck ........ A01B 63/004 |
| 10,257,979 B2 * | 4/2019 | Walter ................ A01D 41/141 |
| 10,524,422 B2 | 1/2020 | Brimeyer et al. |
| 2008/0256914 A1 * | 10/2008 | Ricketts ................ A01D 41/16 56/10.8 |

(Continued)

FOREIGN PATENT DOCUMENTS

AU     2010241336 B2     12/2010
CN       207977932 U     10/2018

(Continued)

OTHER PUBLICATIONS

Extended European Search Report for EP Application No. 22190689.4 dated Dec. 16, 2022 (five pages).

*Primary Examiner* — Abigail A Risic
(74) *Attorney, Agent, or Firm* — Peter K. Zacharias; Rebecca L. Henkel; Rickard K. DeMille

(57) ABSTRACT

A feeder for an agricultural vehicle includes a feeder body defining a hollow interior space for receiving crop material from a header of the agricultural vehicle, a faceplate that is movably mounted to the feeder body, and a scissor jack assembly that is configured for rotating the faceplate with respect to the feeder body to adjust a fore-aft angle of the faceplate relative to the feeder body. The faceplate is configured to be removably coupled to the header of the agricultural vehicle.

14 Claims, 6 Drawing Sheets

(56) References Cited

U.S. PATENT DOCUMENTS

| | | | |
|---|---|---|---|
| 2016/0150716 A1* | 6/2016 | De Coninck | A01D 41/16 56/153 |
| 2016/0270290 A1 | 9/2016 | Johnson et al. | |
| 2016/0278276 A1* | 9/2016 | De Coninck | A01D 34/008 |
| 2017/0311545 A1* | 11/2017 | Walter | A01D 41/16 |

FOREIGN PATENT DOCUMENTS

| | | |
|---|---|---|
| CN | 208413728 U | 1/2019 |
| EP | 0448844 A1 | 10/1991 |
| EP | 3090616 A1 | 11/2016 |
| RU | 2157613 C1 | 10/2000 |

\* cited by examiner

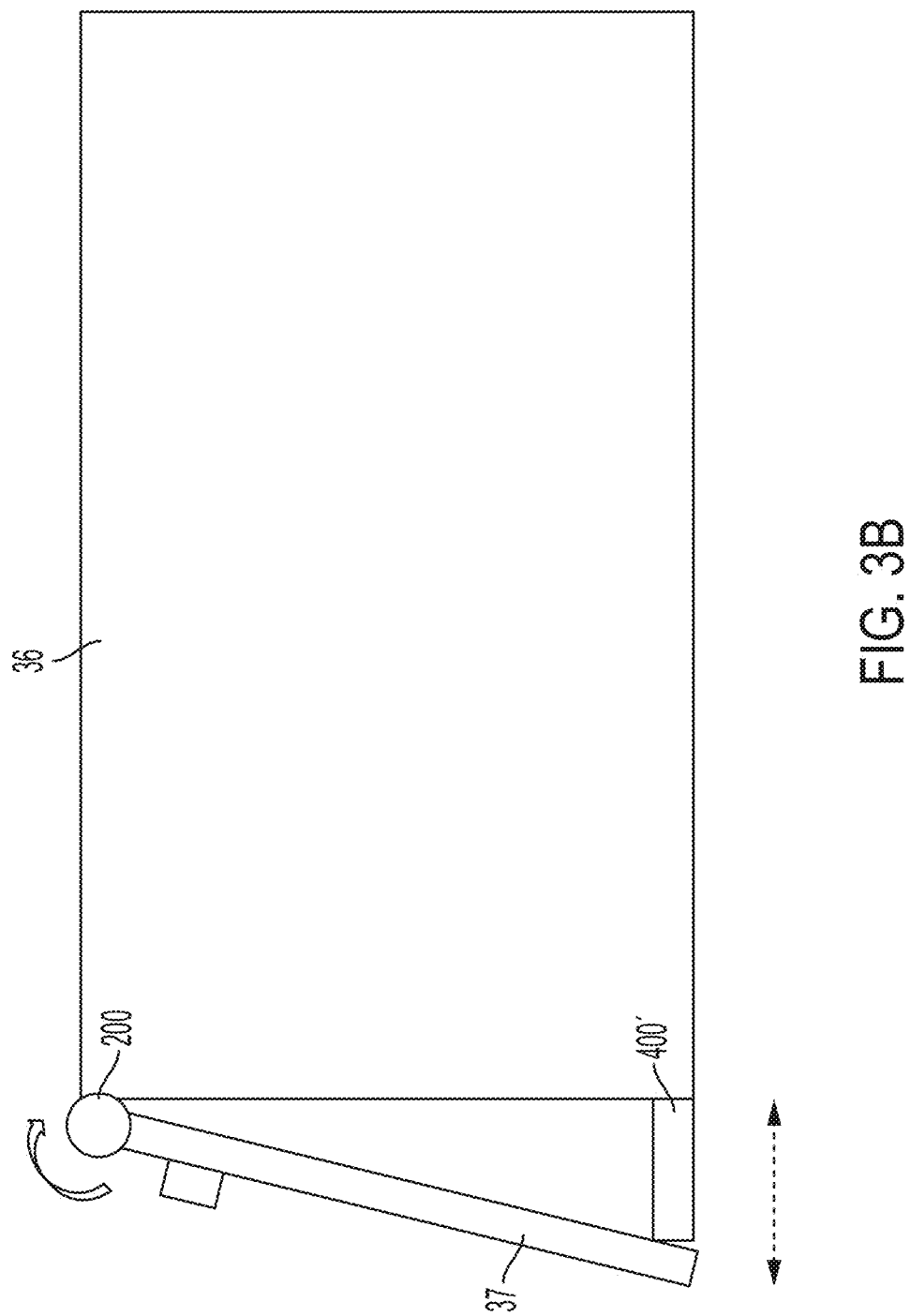

APPARATUS AND METHOD FOR ADJUSTING FACEPLATE OF FEEDER FOR AGRICULTURAL VEHICLE

FIELD OF THE INVENTION

The present invention relates to agricultural harvesters. More specifically, the present invention relates to an apparatus and method for adjusting a position of a faceplate of a feeder for an agricultural vehicle, such as a combine harvester.

BACKGROUND OF THE INVENTION

FIG. 1 depicts a self-propelled agricultural combine 20. Combine 20 has a front end to which a header 32 can be connected. Header 32 is commonly referred to as a grain header and is typically utilized for harvesting smaller grains, such as, but not limited to, wheat and soybeans. Another well-known header 34 is shown, which is a corn header. Corn header 34 can also be connected to combine 20. Headers 32 and 34, as well as other headers (not shown), are configured to be interchangeably mounted on the front end of a feeder 36 of combine 20 for configuring combine 20 to harvest a particular crop.

In operation, the crops harvested by a header, such as header 32 or header 34, will be gathered up by the header 32/34 and conveyed by feeder 36 (also referred to in the art as a feederhouse) rearwardly and upwardly into the body of the combine 20, for processing by a threshing system 38. System 38 is operable for threshing and separating grain from larger elements of crop material, such as stems, leaves, cobs and larger fragments of pods, such that the grain will fall into a cleaning system 40, which will further process or clean smaller elements of crop residue from the grain, and the grain will be conveyed to a grain tank 42 or other collector. The larger elements of crop material will be propelled rearwardly through a rear end 22 of the body of combine 20 by a rapidly rotating beater 44, and into an inlet opening of a spreader 24, as generally denoted by arrow A, in FIG. 1. Further details of combine 20 may be described in U.S. Pat. No. 8,010,262 to Blue Leaf IP Inc. (the '262 patent), which is incorporated by reference in its entirety and for all purposes. It is noted, however, that combine 20 of FIG. 1 departs from the combine shown in the '262 patent. And, although FIG. 1 is described in the background section, it should be understood that the combine 20 is not admitted prior art.

Headers 32 and 34 are interchangeably attached to a faceplate 37 on the free end of feeder 36. Specifically, headers 32/34 include couplers for releasably mounting to a coupling 39 on faceplate 37. A feeder faceplate angle B can be adjusted to accommodate the particular header 32/34. Angle B may also be adjusted due to crop conditions, ground conditions, and more. Angle B may be defined as the fore/aft pitch angle of the feeder. Stated differently, feeder faceplate 37 rotates along a transverse axis passing through feeder 36 (e.g., an axis passing through the page of FIG. 1), and feeder faceplate angle B represents rotation about that axis.

In view of the foregoing, it would be desirable to provide a simple and easy way for an end-user to adjust angle B of faceplate 37 of feeder 36.

SUMMARY OF THE INVENTION

According to one aspect of the invention, a feeder for an agricultural vehicle includes a feeder body defining a hollow interior space for receiving crop material from a header of the agricultural vehicle, a faceplate that is movably mounted to the feeder body, and a scissor jack assembly that is configured for rotating the faceplate with respect to the feeder body to adjust a fore-aft angle of the faceplate relative to the feeder body. The faceplate is configured to be removably coupled to the header of the agricultural vehicle.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3B is a side elevation view of the feeder of FIG. 3A having a fully extended faceplate.

Figure 1:
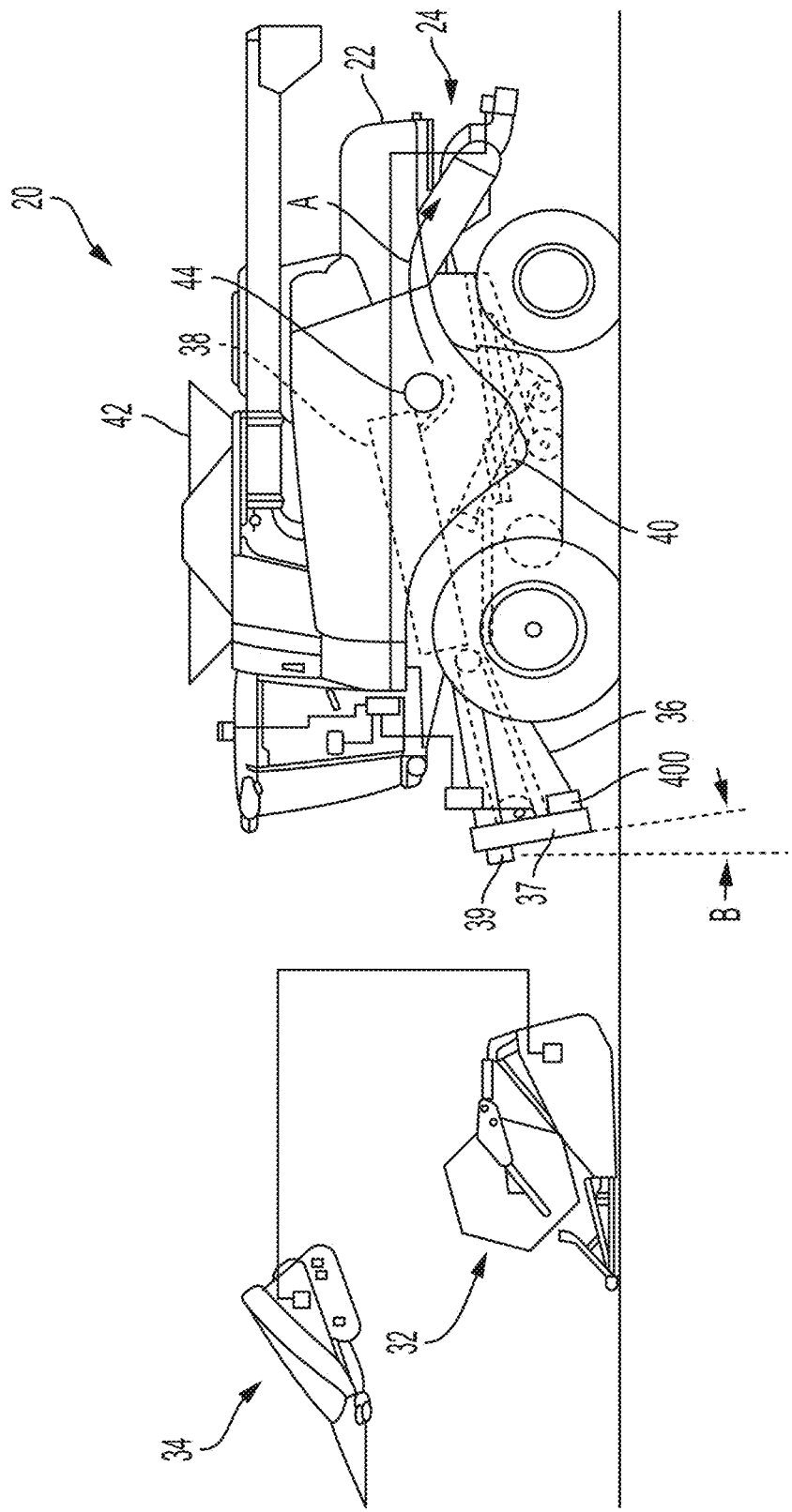
FIG. 1 is a side view of an embodiment of an agricultural harvester in the form of a combine, and two different headers that are each configured to be mounted to a feeder of the combine.

The feeder is shown schematically in FIGS. 2A-3B.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "forward" (or fore), "rearward" (or rear or aft), "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIG. 1.

Figure 2A:
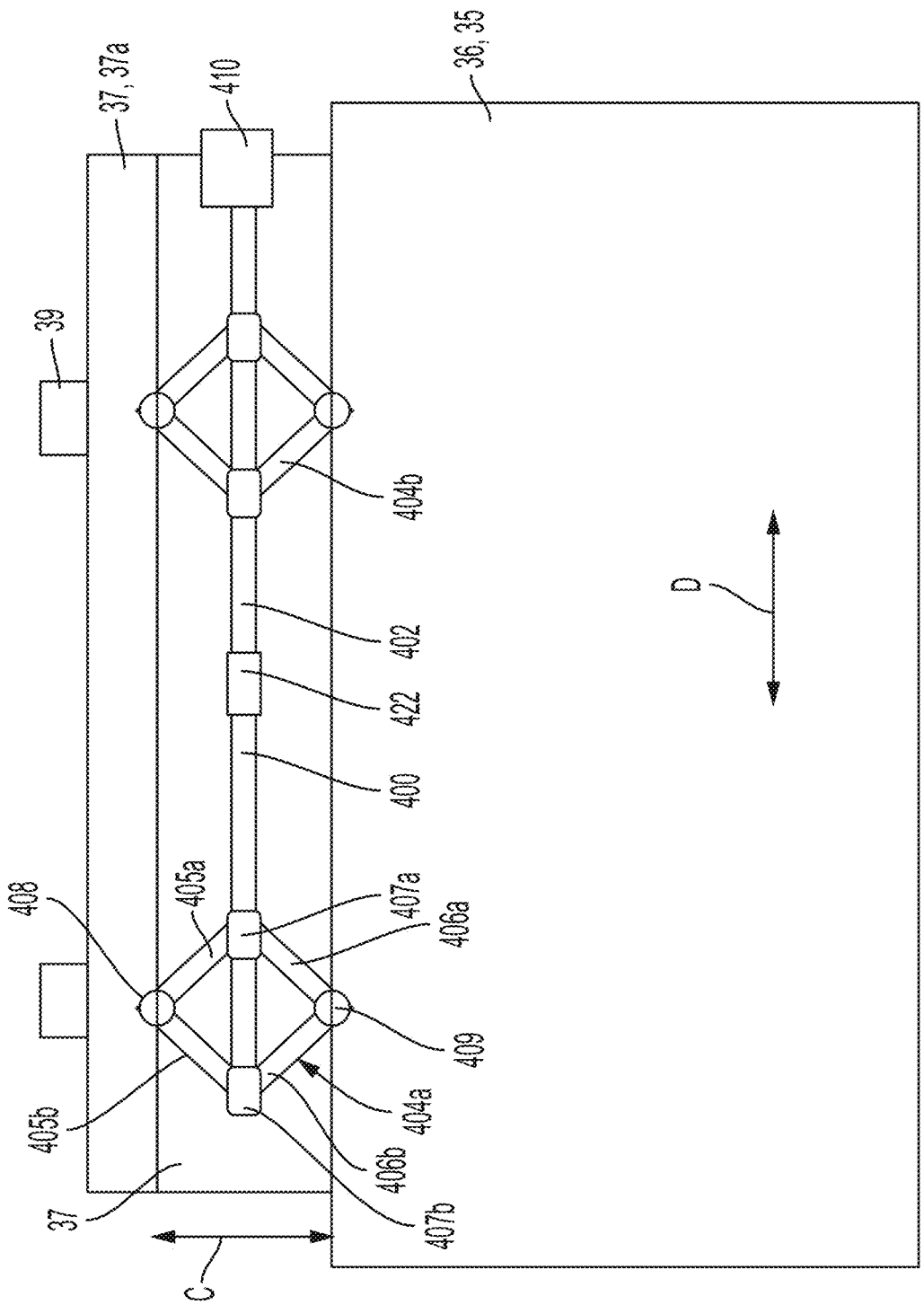
FIG. 2A is a bottom plan view of the feeder of the combine of FIG. 1, wherein a faceplate of the feeder is shown partially extended by a scissor jack assembly.
Figure 2B:
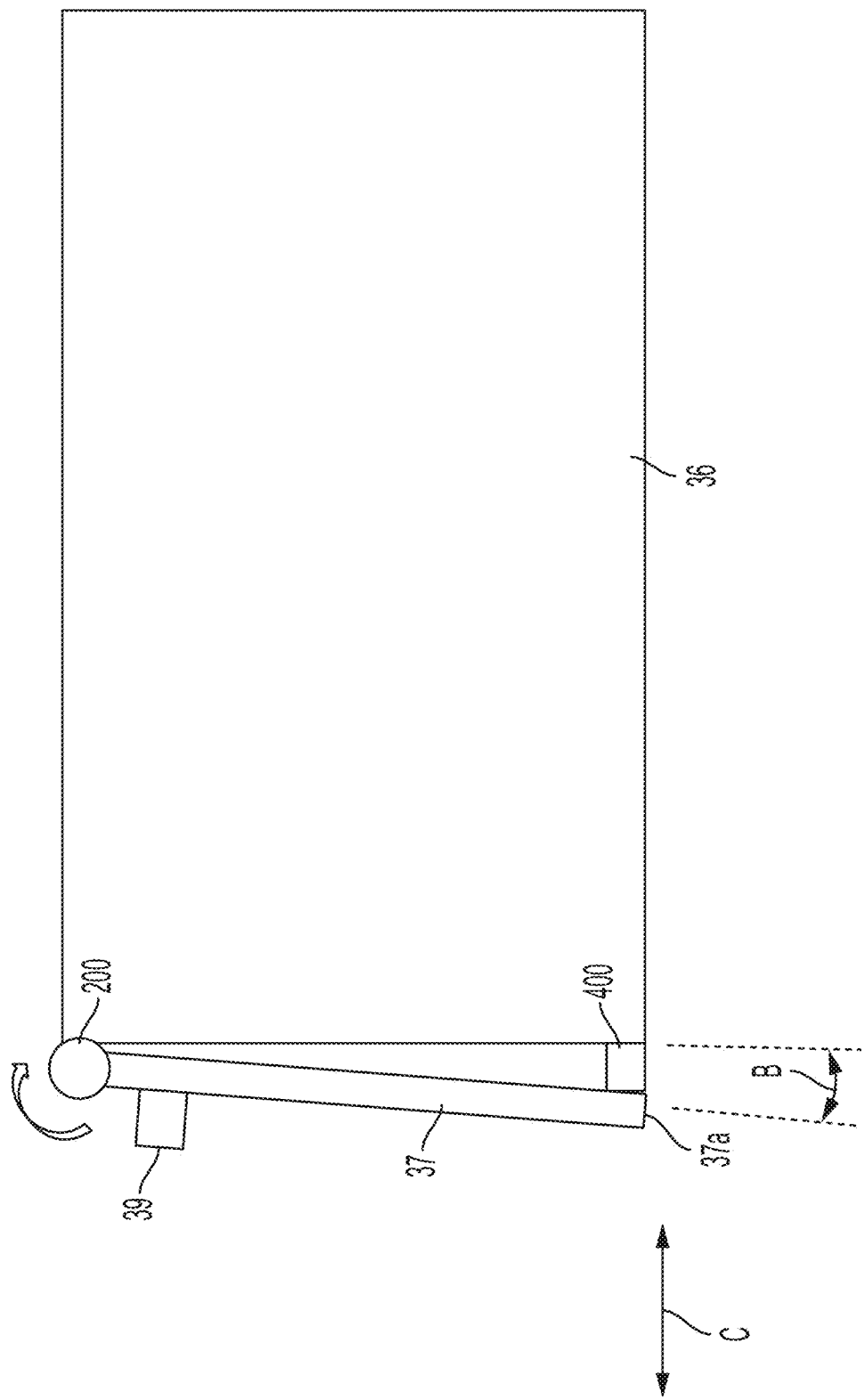
FIG. 2B is a side elevation view of the feeder of FIG. 2A having a partially extended faceplate.
Figure 3A:
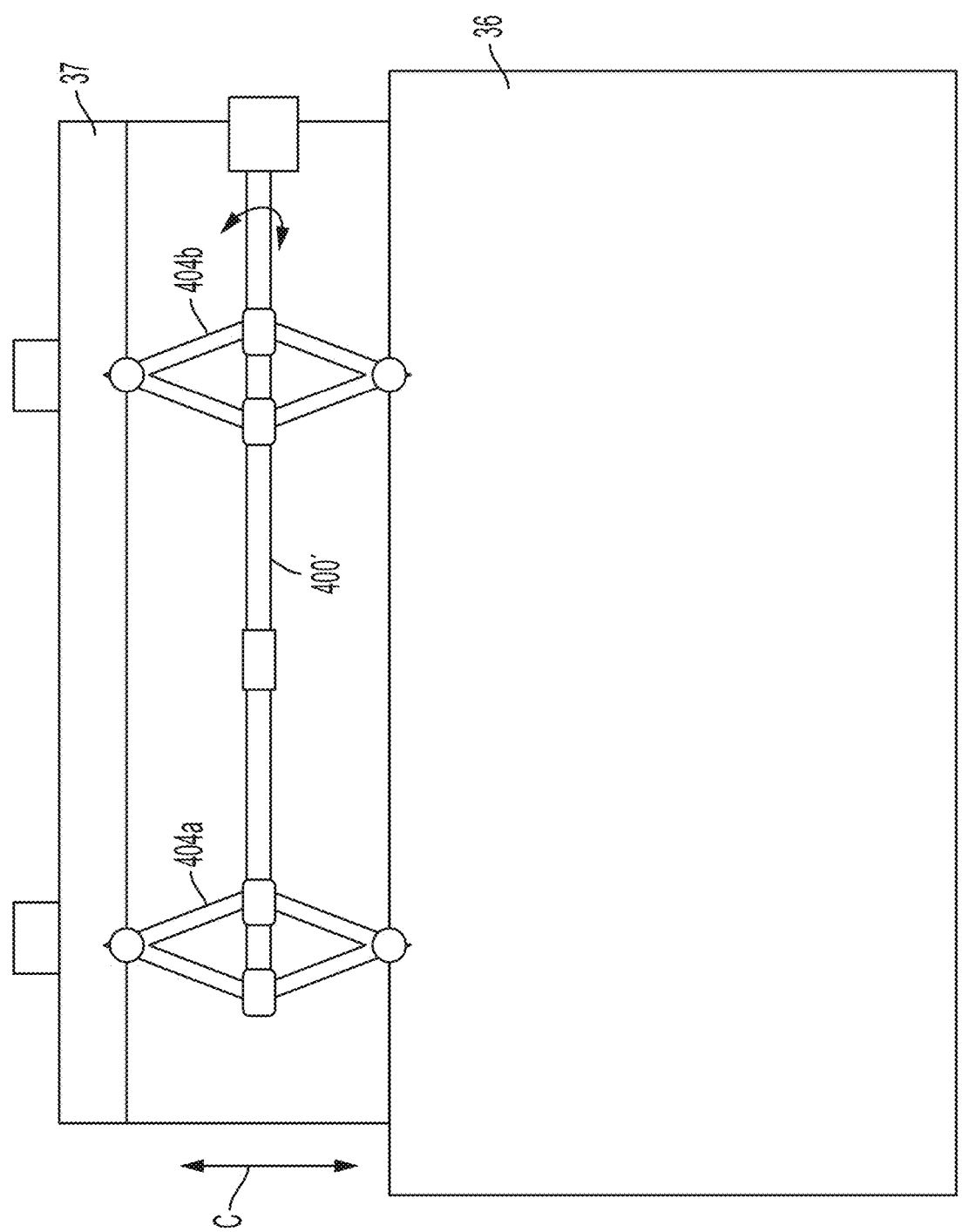
FIG. 3A is another bottom plan view of the feeder of the combine of FIG. 1, wherein a faceplate of the feeder is shown fully extended by the scissor jack assembly.

Referring now to the drawings, and more particularly to FIGS. 1, 2A and 2B, feeder 36 includes a body 35 having a hollow interior for receiving crop material from the header 32/34. Faceplate 37 is mounted to the forward end of feeder body 35. Faceplate 37 may not be permanently mounted to feeder body 35, however, it is not readily and easily removable from feeder body 35. Faceplate 37 includes one or more couplings 39 that are configured to be releasably connected to mating couplings on header 32/34, as was described above. Couplings 39 may be located anywhere on faceplate 37, and are not limited to that which is shown. Couplings 39 may be hinges, bolts, hooks, fasteners, or any other couplings known in the agricultural vehicle arts.

Faceplate 37 is mounted to the top side of faceplate 37 by a hinge 200, such that faceplate 37 is capable of being rotated about hinge 200 (see curved arrow) with respect to feeder body 35. As was noted above, it may be necessary to rotate faceplate 37 about hinge 200 to accommodate various header styles or to adjust the position of a header relative to the ground. Rotating the faceplate 37 changes the feeder faceplate angle 'B' as well as the distance between bottom side 37a of feeder 37 (as measured along fore-aft axis 'C').

A scissor jack assembly 400 (referred to hereinafter as assembly 400) is configured to rotate faceplate 37 with respect to feeder body 35. Assembly 400 is mounted at the bottom side 37a of faceplate 37 at a location (i) between the forward side of feeder body 35 and the rear side of faceplate 37, and (ii) beneath hinge 200. Assembly 400 extends transversely along axis D (FIG. 2A). It should be understood that location of assembly 400 is not limited to that which is shown. For example, assembly 400 may be positioned closer to the top end of faceplate 37 and hinge 200 may be positioned at the bottom end of faceplate 37, or, assembly 400 could extend vertically (as opposed to transversely).

Figure 4:
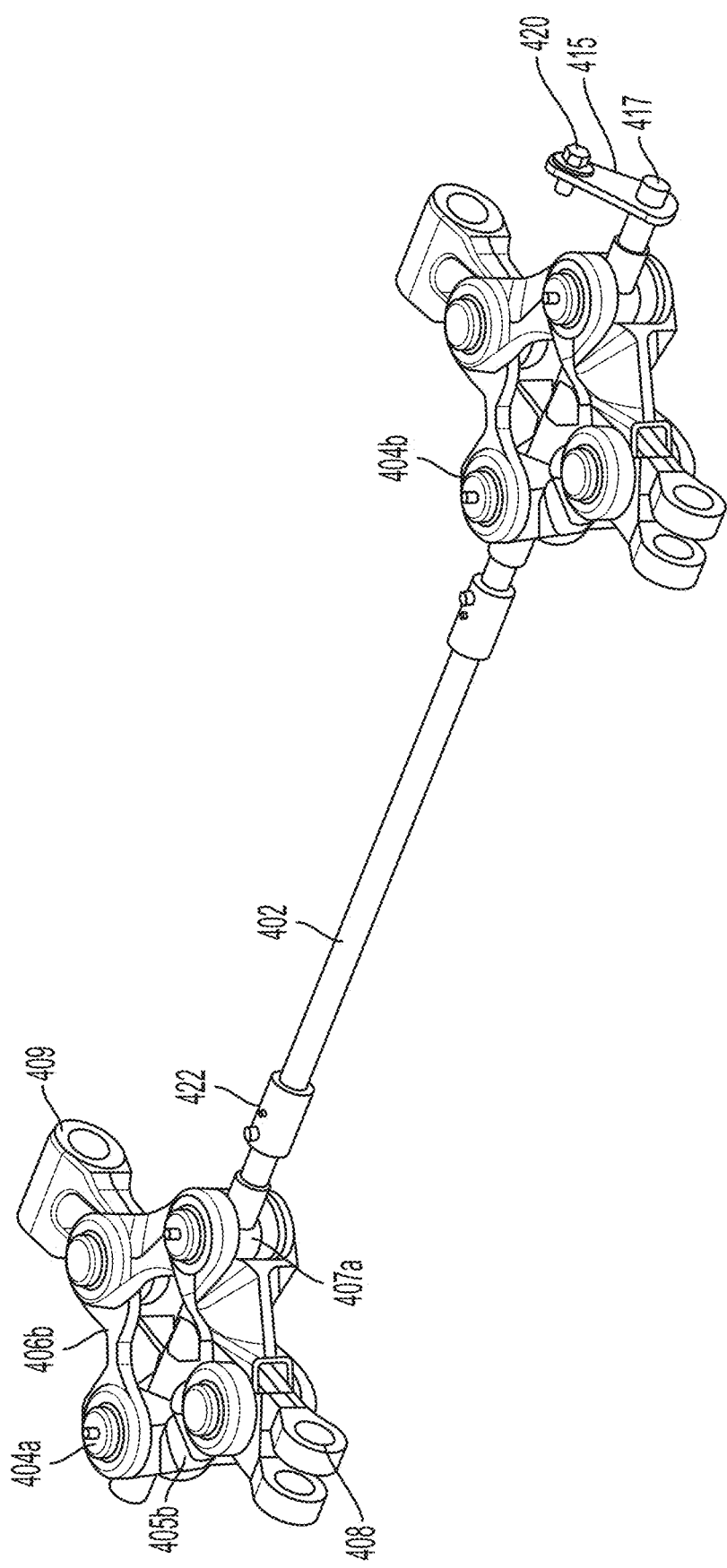
FIG. 4 is an isometric view of the scissor jack assembly of the combine of FIG. 1.

Turning now to FIGS. 2A and 4, assembly 400 comprises a threaded shaft 402 including threaded segments (i.e., mechanical threads) extending along its length as well as non-threaded segments. The segments of threaded shaft 402 may be interconnected by couplings 422, sleeves, bolts, etc. A first scissor jack 404a is mounted to one side of threaded shaft 402, and a second scissor jack 404b is mounted to an opposing side of threaded shaft 402. Scissor jacks 404a and 404b are substantially identical, and may be referred to herein either individually or collectively as jack(s) 404. Although only one jack 404 will be described hereinafter, it should be understood that foregoing description also applies to the other jack 404.

Jack 404 includes two connected arms 405a and 405b each having one end that is pivotably connected to a hinge 208. Hinge 208 pivotably interconnects jack 404 with faceplate 37. As best shown in FIG. 4, hinge 208 optionally includes two knuckles defining an open passageway through which a rod (not shown) passes. The rod is connected to faceplate 37. Hinge 208 can pivot about the rod. The other end of arms 405a and 405b are pivotably mounted to pins 407a and 407b, respectively. Each pin 407 includes a threaded opening that is threadedly connected to threads of threaded shaft 402, such that rotation of threaded shaft 402 causes translation of pins 407.

Jack 404 also includes two connected arms 406a and 406b each having one end that is pivotably connected to a hinge 409. Hinge 409 pivotably interconnects jack 404 with feeder body 35. As best shown in FIG. 4, hinge 409 optionally includes one knuckle defining an open passageway through which a rod (not shown) passes. The rod is connected to feeder body 35. Hinge 209 can pivot about the rod. The other end of arms 406a and 406b are pivotably mounted to pins 407a and 407b, respectively. Pins 407a and 407b may be referred to collectively as pins 407. Pin 407a is connected to a right-hand thread on threaded shaft 402, and pin 407b is connected to a left-hand thread on threaded shaft 402, or vice versa, such that pins 407a and 407b translate along axis D in opposite directions upon rotating threaded shaft 402.

More particularly, in one rotational direction of threaded shaft 402, pins 407 of jack 404a translate toward each other, and, pins 407 of jack 404b also translate toward each other. Jacks 404a and 404b move in concert (simultaneously) with each other because they are connected to a common threaded shaft 402. When pins 407 of jack 404 translate toward each other, arms 405a/b and 406a/b rotate inwardly along a transverse axis D and extend outwardly along the fore-aft axis C. Consequently, starting from the partially extended (i.e., rotated) position or state of assembly 400 shown in FIGS. 2A/2B, the end 37a of faceplate 37 rotates further away from feeder body 35 and the feeder faceplate angle 'B' increases until the end 37a of faceplate 37 reaches the fully extended (i.e., rotated) position or state of assembly 400' shown in FIGS. 3A/3B.

In an opposite rotational direction of threaded shaft 402, pins 407 of jack 404a translate away from each other, and, pins 407 of jack 404b also translate away from each other. When pins 407 of jack 404 translate away from each other, arms 405a/b and 406a/b rotate outwardly along a transverse axis D and extend inwardly along the fore-aft axis C. Consequently, starting from the fully extended (i.e., rotated) state of assembly 400' shown in FIGS. 3A/3B, the end 37a of faceplate 37 rotates toward feeder body 35 and the feeder faceplate angle 'B' decreases until the end 37a of faceplate 37 reaches the partially extended (i.e., rotated) position 400 shown in FIGS. 2A/2B. Although not shown, further rotation is possible until the feeder faceplate angle 'B' reaches a value of zero.

The free end of threaded shaft 402 may be hexagonal, square, or, more generally, non-circular, as viewed in cross-section. The free end of threaded shaft 402 may be rotated manually by a wrench or driver, for example. Alternatively, threaded shaft 402 may be rotated in an automated fashion by a motor 410 that is controlled by an operator in the cab of combine 20, for example. Motor 410, or a transmission connected thereto, may be self-locking to prevent inadvertent rotation of faceplate 37. Motor 410 may be powered electrically or hydraulically, for example.

Turning to FIG. 4, if threaded shaft 402 is operated manually, then a removable lock 415 in the form of a plate may be connected to threaded shaft 402 to prevent inadvertent rotation of threaded shaft 402. More particularly, lock 415 includes a first opening 417 having a shape that is complementary to the non-circular cross-sectional shape of the free end of threaded shaft 402 such that threaded shaft 402 and first opening 417 are connected in a non-rotatable manner. Lock 415 includes a second opening for receiving a threaded fastener 420. Fastener 420 can be connected to faceplate 37, feeder 36, or another fixed point on combine 20. It should be understood that rotation of threaded shaft 402, and consequent movement of jacks 404, is prevented when lock 415 is mounted to threaded shaft 402 and fastener 420 is connected to a fixed point.

It should be understood that lock 415 may vary from that which is shown. Lock 415 can be any device that is configured to resist rotation of threaded shaft 402. Lock 415 may be a collar, collet, fastener, clip, pin, clamp, and so forth. For that reason, lock 415 may also be referred to herein as a locking device or "means for locking" the threaded shaft 402.

Assembly 400 may vary from that which is shown and described. It should also be understood that the details of jack 404 can vary, and different styles of jacks are known to those skilled in the art (e.g., scissor, jackscrew, house, floor, bottle, inflatable, air hydraulic, strand, farm, etc.). In lieu of using jacks, assembly 400 shown in FIGS. 2B and 3B may simply represent a motor having a protruding piston, wherein the motor is mounted to the feeder body 35 and the piston is mounted to faceplate 37. The motor may be powered electrically or hydraulically, for example. In view of all of the different devices described herein that may be used to rotate faceplate 37 with respect to feeder body 35, assembly 400 may be generally referred to herein as a "means for moving" faceplate with respect to feeder body 35.

While this invention has been described with respect to at least one embodiment, the present invention can be further modified within the spirit and scope of this disclosure. For example, the scissor jack assembly 400 can include one jack 404 or two (or more) interconnected jacks 404, as shown. The scissor jack assembly 404 may be positioned on either the top or the bottom of the feeder. The shaft 402 may be on the top, middle or bottom side of the feeder or at any position in between. Other alternatives and modifications are described above.

This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feeder for an agricultural vehicle, said feeder comprising:
   a feeder body defining a hollow interior space for receiving crop material from a header of the agricultural vehicle,
   a faceplate that is movably mounted to the feeder body, wherein the faceplate is configured to be removably coupled to the header of the agricultural vehicle, and
   a scissor jack assembly that is configured for rotating the faceplate with respect to the feeder body to adjust a fore-aft angle of the faceplate relative to the feeder body.

2. The feeder of claim 1 further comprising a coupler mounted to the faceplate that is configured to be mounted to the header of the agricultural vehicle.

3. The feeder of claim 1, further comprising a hinge for pivotably connecting the faceplate to the feeder body.

4. A subassembly comprising the header mounted to the feeder of claim 1.

5. The feeder of claim 1, wherein the scissor jack assembly is configured for rotating the faceplate about a transverse axis of the feeder or agricultural vehicle for adjusting the fore-aft angle of the faceplate.

6. The feeder of claim 1, further comprising a hinge for pivotably connecting the faceplate to the feeder body, wherein the hinge is positioned at an elevation above the scissor jack assembly.

7. The feeder of claim 1, wherein the scissor jack assembly comprises a threaded shaft, and at least one scissor jack that is connected to the threaded shaft, wherein rotation of the threaded shaft causes movement of the scissor jack which causes the faceplate to rotate with respect to the feeder body.

8. The feeder of claim 7, further comprising two scissor jacks mounted to the threaded shaft, wherein rotation of the threaded shaft causes movement of said two scissor jacks.

9. The feeder of claim 7, further comprising a motor for rotating said threaded shaft.

10. The feeder of claim 7, further comprising a lock that is removably connected to the threaded shaft for preventing rotation of the threaded shaft.

11. The feeder of claim 10, wherein the lock comprises an opening for receiving the threaded shaft in a non-rotatable manner, and a fastener for mounting to one of the feeder body, the faceplate and a fixed point on the agricultural vehicle to prevent rotation of the threaded shaft.

12. The feeder of claim 11, wherein the opening has a shape that is complimentary to a cross-sectional shape of the threaded shaft.

13. An agricultural vehicle comprising the feeder of claim 1.

14. A combine harvester comprising the feeder of claim 1.

* * * * *